United States Patent Office 3,544,589
Patented Dec. 1, 1970

3,544,589
PROCESS FOR PREPARING PYRRYL-(2)-ACETIC ACID ESTERS
Winfried Orth, Schifferstadt, Ludwig Rappen, Duisburg-Meiderich, and Gerd Busse, Krefeld, Germany, assignors to Rutgerswerke und Teerverwertung Aktiengesellschaft, Frankfurt am Main, Germany
No Drawing. Filed Nov. 28, 1967, Ser. No. 686,286
Claims priority, application Germany, Dec. 3, 1966, R 44,720
Int. Cl. C07d 27/26
U.S. Cl. 260—326.3            7 Claims

ABSTRACT OF THE DISCLOSURE

Pyrryl-(2)-acetic acid esters corresponding to the formula

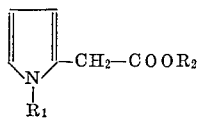

wherein $R_1$ stands for hydrogen or alkyl groups and $R_2$ stands for alkyl groups or aralkyl groups, are prepared by alkaline saponification of pyrryl-(2)-acetonitriles and conversion of the resulting alkali salts by means of alkylating agents into pyrryl-(2)-acetic acid esters, in a single reaction stage.

The resulting compounds are useful as starting materials in the production of phenothiazime derivatives which are useful in medicine as antihistamines, spasmolytica and local anesthetics.

---

It has been known that pyrryl-(2)-acetic acid ethylester is formed by reacting pyrrols with diazoacetic acid ethylester in the presence of copper powder. However, the yields obtainable in this process amount to 23.5% only (Berichte, 64, 1924 (1931) and J. Amer. Chem. Soc. 55,3828, (1933)). The conventional ester preparation by acid esterification of pyrryl-acetic acids is not applicable in view of the sensitiveness to acids of the pyrrol ring. However, it has been known that carboxylic acids which are sensitive to H-ions, form by esterification of their salts with alkylating agents, the corresponding carboxylic acid esters. These processes have particularly the disadvantage, that the salts of carboxylic acid must be isolated, partly purified, dried and then distributed in a non-aqueous solvent with such fineness that esterification becomes feasible. A two-step process is, therefore, indispensable.

The main object of the present invention is the preparation of pyrryl-(2)-acetic acid esters by saponification of pyrryl-(2)-aceto-nitriles and subsequent alkylation of the resulting alkali salts to form pyrryl-(2)-acetic acid esters in a single step procedure, i.e., without isolation of the alkali salts, with increased yields.

We have found that these objects are attained by a process for preparing pyrryl-(2)-acetic acid esters of the formula

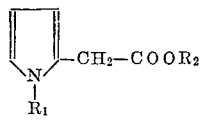

wherein $R_1$ is hydrogen or an alkyl group having 1–4 carbon atoms and $R_2$ is an alkyl or aralkyl group, by saponification of pyrryl-(2)-acetonitriles with an aqueous alkali hydroxide solution and subsequent reaction of the resulting alkali salts of pyrryl-(2)-acetic acids with alkylating agents. These two reactions are carried out in a one-step process, by converting the pyrryl-(2)- acetonitriles under heating with alkali lye into salts of pyrryl-(2)-acetic acids, and after extensively removing water from the latter, reacting them directly and with the addition of a lower ketone, with alkylating agents. As examples of $R_2$, the alkyl groups, methyl, propyl, butyl and as the preferred example of aralkyl benzylchloride, are mentioned.

The first of said reactions has particularly high yields if saponification of the pyrryl-(2)-acetonitriles takes place in the presence of an organic solvent, in which the alkali salts of pyrryl-(2)-acetic acids are well soluble, if said solvent is miscible with alkali lyes and can be easily dehydrated—e.g. by simple distillation, or azetropic distillation. Upon meeting these conditions the water of aqeous alkali solutions can be easily distilled off after saponification of the pyrryl-(2)-acetonitriles is carried out, without precipitation of the alkali salts of pyrryl-(2)-acetic acid, from the reaction mixture. As solvents for this first reaction step alcohols, lower glycols and their ethers, particularly glycolmonomethylether, can be used.

For carrying out the above described second reaction according to the invention, organic solvents are used, which show good solubility of the alkylating agents used, and of the pyrryl-(2)-acetic acid esters which are formed in the course of the reaction. Furthermore, inorganic salts —particularly alkali halides—should be insoluble in the organic solvents used in the second reaction, so that the alkali salts which are formed in the reaction of the pyrryl-(2)-acetic acid salts with alkylating agents, should precipitate from the reaction mixture, as near as possible quantitatively and do not interfere with the subsequent distillation. These conditions have been found to be met by lower ketones, particularly methylethyl ketone.

We have further found that in the preparation of pyrryl-(2)-acetic acid esters according to the present invention, unpurified pyrryl-(2)-acetic acid nitriles which contain pyrryl-(2)-acetic acid amines, can also be used. Said unpurified nitriles are obtained in the reaction of trialkyl-[pyrryl-(2)-methyl]-ammonium compounds with alkali cyanides. By proceeding in this manner, the pyrryl-(2)-acetic acid amines formed as a by-product in the production of pyrryl-(2)-acetonitriles, are likewise converted into pyrryl-(2)-acetic acid esters.

EXAMPLE 1

Into a solution of 85 g. KOH in 500 ml. of an aqueous glycolmonomethylether of 50%, 120 g. of N-methyl-pyrryl-(2)-acetonitrile are added by drops and saponified by heating to boiling temperature for 24 hours. Subsequently, under a vacuum of 170–180 mm. mercury, about 400 ml. of aqueous glycolmonomethylether containing about 40–42% $H_2O$ are distilled off. By repeated addition of 250 ml., anhydrous glycolether to the residue and distilling off again about 360–380 ml., the residue is dehydrated to less than 10% of the initial water content. The potassium salt remaining behind is reacted, after addition of 300 ml. methylethyl ketone and 1 g. potassium iodide, with 302 g. of n-butylbromide by boiling under reflux for 16 hours. The KBr formed during esterification is separated by filtration and the filtered liquid is processed by distillation. After the solvent, the excess of n-butylbromide, butanol, and the residual glycolmonomethylether are distilled off, the crude ester is subjected to high vacuum distillation. 180 g. of N-methylpyrryl-(2)-acetic acid butylester (boiling point$_{0.1}$: 80–86° C.; $n_{20}$: 1.4868) are thus obtained.

The yield amounts to 92%, based on the N-methyl-pyrryl-(2)-acetonitrile charged.

EXAMPLE 2

120 g. of N-methylpyrryl-(2)-acetonitrile are saponified in a mixture of 250 ml. of propyleneglycol, 250 ml.

of water and 85 g. of KOH by heating to 100–110° C. during 16 hours. Subsequently, under a vacuum of 150 mm. mercury, about 400 ml. of the aqueous propyleneglycol are distilled off. To the distillation residue 250 ml. of propyleneglycol are added and 350 ml. are additionally distilled off under vacuum. To the residue, which still contains about 10% of the initially added water, 300 ml. of methylethylketone and 277 g. of benzylchloride are added and the resulting mixture is heated to boiling for 20 hours. The precipitated KCl is separated by filtration and the filtrate is processed by distillation. First the solvent is distilled off under normal pressure and subsequently under the vacuum of a water-jet vacuum pump, the higher boiling ingredients, such as the excess of benzylchloride, benzylalcohol, and residual propyleneglycol, are removed. The crude benzylester remaining as a residue is finally distilled under high vacuum. In this manner, 165 g. of N-methylpyrryl-(2)-acetic acid benzylester are obtained, corresponding to a yield of 72% based on the weight of the reacted N-methylpyrryl-(2)-acetonitrile (boiling point$_{0.1}$: 80–85° C.; $n_{20}$: 1.4858).

EXAMPLE 3

106 g. of pyrryl-(2)-acetonitrile are saponified within 24 hours by a solution of 85 g. KOH in 500 ml. of aqueous glycolmonomethylether of 75%, at boiling temperature under reflux. Subsequently, the water present in the reaction mixture is removed by azeotropic distillation under reduced pressure, and the resulting aqueous glycolmonomethylether is used for further saponifications. After addition of 300 ml. of acetone and 5 g. of potassium iodide to the distillation residue, reaction with 330 g. of ethylbromide follows, likewise at boiling temperature under reflux. Subsequent distillation of the reaction mixture separated from the precipitated potassium bromide yields 130 g. of pyrryl-(2)-acetic acid ethyleester (boiling point$_{0.15}$: 70–75° C.).

The yield calculated on the amount of pyrryl-(2)-acetonitrile charged, amounts to 85%.

EXAMPLE 4

An amount of about 400 g. crude N-methylpyrryl-(2)-acetonitrile which has been prepared from 3.2 mols of dimethyl-[N]methylpyrryl-(2)-methyl]-amine by reaction with dimethylsulfate and subsequently with sodium cyanide and contains about 10% of N-methylpyrryl-(2)-acetic acid amide, is dropwise introduced into a solution of 266 g. of KOH in 1400 ml. of aqueous glycolmonomethylether of 50% and saponified at 105° C. within 24 hours. Subsequently, in the manner described in the above Example 1, the reaction mixture is dehydrated by azeotropic distillation so that it contains about 10% of the water originally added. The potassium of salt of N-methylpyrryl-(2)-acetic acid which is present in the residue is reacted, after addition of 870 ml. of methylethylketone and 3 g. of potassium iodide, with 905 g. of n-butylbromide. Esterification is completed after maintaining reflux temperature for 16 hours. The potassium bromide is filtered off and the filtrate is processed by distillation. 448 g. of N-methylpyrryl-(2)-acetic acid butylester (boiling point$_{0.1}$: 80–84° C.; $n_{20}$: 1.4855) are thus obtained.

Calculated on the dimethyl-(N-methylpyrryl-(2)-methyl)-amine, the yield amounts to 72%.

It will be understood that this invention is not limited to the use of conditions and ingredients specifically described above and can be carried out with various modifications. Thus, in a manner analogous to that described in the above examples, the following alkylhalides can be used for reacting with the alkali salts of pyrrylacetic acids: methylbromide, methyliodide, propylbromide, propyliodide and butyliodide. As the aralkylhalide, preferably benzylchloride, is used in the manner described in the above Example 2. As specific examples of the solvents adapted to be used in the above mentioned first reaction, i.e. saponification, the following are mentioned: ethyleneglycol, propyleneglycol, ethyleneglycolmonomethylether, ethyleneglycolmonoethylether and diethyleneglycolmonomethylether. As alkylating agent, dimethylsulfate can also be used. As lower ketones all ketones can be used which are capable of dissolving alkali salts of pyrrylacetic acid. These ketones can be used in a manner similar to that described in the above examples. As specific examples of ketones acetonylacetone and methylisobutylketone are mentioned. The term "alkali salt" is used herein to denote sodium and potassium salts.

The compounds prepared by the process of the present invention are useful as starting materials in the production of known phenothiazine derivatives which are used in medicine as antihistamines, spasmolytica and local anesthetics. For example, the phenothiazine derivative 10-[2-(1′-methyl-2′-pyrrolydyl) ethyl] - phenothiazine—which has antihistaminic activity—can be prepared from 1-methylpyrryl-(2)-acetic acid-ethylester (see British Pat. No. 823,733, Example 2). Furthermore, from 1-ethyl-pyrryl-(2)-acetic acid ethylester, the compound β - (1-methyl-2-pyrrolidyl) - ethyl phenyl - cyclohexylglycollate hydrochloride—which is active and used as local anesthetic—can be prepared (see Example 5 of British Pat. No. 815,844).

The parts and percentages described herein are by weight, if not otherwise stated.

The subscript figure 0.1 means the pressure in atmospheres under which the boiling point was measured and the recitation $n_{20}$ means the index of refraction for any substance, which is the ratio of the velocity of light in a vacuum to its velocity in the substance at a temperature of 20° C.

What is claimed is:

1. Process for preparing pyrryl-(2)-acetic acid esters corresponding to the formula

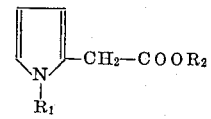

wherein $R_1$ is selected from the group consisting of hydrogen and alkyl radicals having 1–4 carbon atoms and $R_2$ is selected from the group consisting of alkyl radicals having 1–4 carbon atoms and the benzyl radical, from a pyrryl-2-acetonitrile, comprising converting the pyrryl-2-acetonitrile by the action of an alkali hydroxide dissolved in a solvent consisting of water and a solvent selected from the group consisting of glycol monomethylether and propyleneglycol, at boiling temperature into salts of pyrryl-(2)-acetic acid, extensively removing the water from the reaction mixture by distillation and treating said salts with an alkylating agent selected from the group consisting of methylbromide, methyliodide, ethylbromide, propylbromide, propyliodide, butylbromide, butyliodide, dimethylsulfate and benzylchloride, with simultaneous addition of a lower ketone solvent, said converting and said treatment with alkylating agent being carried out in one reaction stage.

2. A process as claimed in claim 1, in which the water present in the reaction mixture is removed under vacuum to dehydrate the reaction mixture up to less than 10% of the initial water content.

3. A process as claimed in claim 1, in which saponification of the pyrryl-(2)-acetonitrile is carried out in the presence of a solvent which is a solvent of alkali salts of pyrryl-(2)-acetic acids, is miscible with aqueous solutions of alkali hydroxides and is suitable for dehydration by distillation.

4. A process as claimed in claim 3, in whcih the solvent is glycolmonomethylether.

5. A process as claimed in claim 1, in which treatment with the alkylating agent is carried out in the presence of methylethylketone.

6. A process as claimed in claim 1, in which treatment with the alkylating agent is carried out in the presence of a catalytic amount of alkali iodide.

7. A process as claimed in claim 1, in which the crude product of reaction of trialkyl-[pyrryl-(2)-methyl]-ammonium with alkalicyanide is used as starting material.

References Cited

Migrdichian, The Chemistry of Organic Cyanogen Compounds (1947), p. 37.

Wagner et al.: Synthetic Organic Chemistry (1953), pp. 484–85.

ALEX MAZEL, Primary Examiner

J. A. NARCAVAGE, Assistant Examiner

U.S. Cl. X.R.

260—325.62